United States Patent
Wiemker et al.

(10) Patent No.: US 10,984,294 B2
(45) Date of Patent: Apr. 20, 2021

(54) APPARATUS FOR IDENTIFYING OBJECTS FROM AN OBJECT CLASS

(71) Applicant: KONINKLIJKE PHILIPS N.V., Eindhoven (NL)

(72) Inventors: Rafael Wiemker, Kisdorf (DE); Tobias Klinder, Uelzen (DE); Axel Saalbach, Hamburg (DE); Jens Von Berg, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 46 days.

(21) Appl. No.: 16/463,390

(22) PCT Filed: Dec. 1, 2017

(86) PCT No.: PCT/EP2017/081248
§ 371 (c)(1),
(2) Date: May 23, 2019

(87) PCT Pub. No.: WO2018/100188
PCT Pub. Date: Jun. 7, 2018

(65) Prior Publication Data
US 2019/0354816 A1   Nov. 21, 2019

(30) Foreign Application Priority Data

Dec. 2, 2016   (EP) .................................... 16201934

(51) Int. Cl.
*G06T 7/13*   (2017.01)
*G06K 9/62*   (2006.01)
(Continued)

(52) U.S. Cl.
CPC ............. *G06K 9/6284* (2013.01); *G06K 9/48* (2013.01); *G06K 9/6277* (2013.01);
(Continued)

(58) Field of Classification Search
CPC ... G06T 2207/10081; G06T 7/13; G06T 7/60; G06K 2209/051; G06K 9/6277; G06K 9/48
See application file for complete search history.

(56) References Cited

U.S. PATENT DOCUMENTS

| RE43,894 E | 1/2013 | Bankman |
| 9,342,881 B1 | 5/2016 | Peleg |
| (Continued) | | |

FOREIGN PATENT DOCUMENTS

WO   WO2013140374 A2   9/2013

OTHER PUBLICATIONS

PCT International Search Report, International application No. PCT/EP2017/081248, dated Jan. 24, 2018.
(Continued)

*Primary Examiner* — Sam Bhattacharya
(74) *Attorney, Agent, or Firm* — Larry Liberchuk

(57) ABSTRACT

The invention relates to an apparatus for identifying a candidate object in image data and determining a likelihood that the candidate object is an object from an object class. The apparatus comprises an image data receiving unit for receiving image data of an object of the object class, a seed element selecting unit for selecting a portion of the image elements as seed elements, a contour point identifying unit for identifying, for each seed element (SE), contour points, the contour points of a seed element circumscribing a candidate object which comprises the seed element, and a seed score determining unit for determining, for each seed element, a seed score indicative of a likelihood that the candidate object is an object from the object class. The invention allows differentiation between an object of an object class of interest and artifacts.

15 Claims, 5 Drawing Sheets

(51) Int. Cl.
  *G06K 9/48* (2006.01)
  *G06T 7/00* (2017.01)
  *G06T 7/60* (2017.01)

(52) U.S. Cl.
  CPC .............. *G06T 7/0012* (2013.01); *G06T 7/13* (2017.01); *G06T 7/60* (2013.01); *G06K 2209/051* (2013.01); *G06T 2207/10081* (2013.01); *G06T 2207/20156* (2013.01); *G06T 2207/30061* (2013.01)

(56) References Cited

U.S. PATENT DOCUMENTS

| 2010/0316267 A1 | 12/2010 | Buelow |
| 2015/0078641 A1 | 3/2015 | Tan |
| 2016/0005218 A1 | 1/2016 | Day |

OTHER PUBLICATIONS

Jain Ramesh et al., "Chapter 5 Contours" In: "Chapter 6 Contours", Jan. 1, 1995 (Jan. 1, 1995), MIT Press & McGraw-Hill, Inc, U.S, XP055372456, pp. 186-233, Chapter 6.5 Circular arcs; p. 200-p. 203.

Tasel Serdar F et al: "A Validated Active Contour Method Driven by Parabolic Arc Model for Detection and Segmentation of Mitochondria", Journal of Structural Biology, Academic Press, United States, vol. 1, 94, No. 3, Mar. 5, 2016 (Mar. 5, 2016), pp. 253-271, XP029518723.

Lung CT Screening Reporting & Data System, Lung Rads | American College of Radiology http://www.acr.org/Quality-Safety/Resources/LungRADS—Downloaded from the Internet May 17, 2019.

Blechschmidt, R.A. et al., "Automated CT Image Evaluation of the Lung: A Morphology-Based Concept", IEEE Transaction on Medical Imaging, May 2001;20(5):434-42.

Moltz J.H. et al., "Advanced Segmentation Techniques for Lung Nodules, Liver Metastases, and Enlarged Lymph Nodes in CT Scans", IEEE Journal of Selected Topics in Signal Processing, vol. 3, No. 1, Feb. 2009.

Steger S. et al., "Application of Radial Ray Based Segmentation to Cervical Lymph Nodes in CT Images", IEEE Transactions on Medical Imaging, vol. 32, No. 5, May 2013, pp. 888-900.

Li K. et al., "Optimal Surface Segmentation in Volumetric Images—A Graph-Theoretic Approach", IEEE Trans Pattern Anal Mach Intell. Author manuscript; available in PMC Feb. 23, 2009, Published in final edited form as: IEEE Trans Pattern Anal Mach Intell. Jan. 2006; 28(1): 119-134.

Barbu, A. et al., "Automatic Detection and Segmentation of Lymph Nodes from CT Data", IEEE Transactions on Medical Imaging, vol. 31, No. 2, Feb. 2012, pp. 240-250.

APPARATUS FOR IDENTIFYING OBJECTS FROM AN OBJECT CLASS

FIELD OF THE INVENTION

The present invention relates to an apparatus and a method for identifying a candidate object in image data and determining a likelihood that the candidate object is an object from an object class. The invention also relates to a medical imaging system comprising the apparatus. The invention further relates to a computer program for identifying a candidate object in image data and determining a likelihood that the candidate object is an object from an object class.

BACKGROUND OF THE INVENTION

The article "Automated CT Image Evaluation of the Lung: A Morphology-Based Concept" by R. A. Blechschmidt et al., IEEE Transactions on Medical Imaging, volume 20, pages 434 to 442 (2001) presents an algorithm of thoracic computed tomography (CT) image evaluation based on pulmonary morphology of emphysema. The algorithm enables to differentiate between small, medium, and large bullae (continuous low-attenuation areas). It is not a texture-based algorithm. The bullae are sorted by size into four size classes: class 1 being within the typical size of lung parenchyma; classes 2 to 4 presenting small, medium, and large bullae. It is calculated how much area the different classes take up of all low-attenuation pixels. A bullae index is derived from the percentage of areas covered, respectively, by small, medium, and large bullae. From the relation of the area of bullae belonging to class 4, to that of those belonging to class 2, a measure of the emphysema type is calculated. It classifies the lung by the type of emphysema in bullous emphysema or small-sized, diffuse emphysema, respectively.

The algorithm is not capable of differentiating between an object from an object class, i.e. a bulla, and an object from a different object class, e.g. a spurious low-attenuation area (artifact). Since artifacts are not excluded from but incorporated into the four size classes, the accuracy of and confidence in the bullae index is deteriorated.

SUMMARY OF THE INVENTION

It is an object of the present invention to provide an apparatus, a method and a computer program for identifying a candidate object in image data and determining a likelihood that the candidate object is an object from an object class, which allow differentiation between an object of an object class of interest and artifacts. It is another object of the present invention to provide a medical imaging system comprising the apparatus.

According to a first aspect of the present invention, an apparatus for identifying a candidate object in image data and determining a likelihood that the candidate object is an object from an object class is provided, the apparatus comprising:

an image data receiving unit for receiving image data of an object of the object class, wherein the image data comprise image elements representing a physical property value of the image data, a seed element selecting unit for selecting a portion of the image elements as seed elements, a contour point identifying unit for identifying, for each seed element, contour points, the contour points of a seed element circumscribing a candidate object which comprises the seed element, and a seed score determining unit for determining, for each seed element, a seed score indicative of a likelihood that the candidate object is an object from the object class, the seed score determining unit comprising:

a contour point subset generating unit for generating, for each seed element, a plurality of contour point subsets of the contour points of the seed element, an arc segment generating unit for generating, for each seed element, a fitted arc segment for each of the contour point subsets of the seed element by fitting an arc segment to each of the contour point subsets of the seed element, a fitted arc segment selecting unit for selecting, for each seed element, those fitted arc segments that fulfill a predetermined selection criterion, and a seed score assigning unit for assigning, to each seed element, a seed score based on the selected arc segments.

The present invention makes the assumption that objects in image data which are from an object class of interest have properties which differ from the properties of objects which are not from the object class. The object class defines the type of object which is of interest. For example, the object class may refer to bullae in lung parenchyma. In this case, it is assumed that an object from the object class is represented in the image data by an area of low radiation attenuation. The physical property may thus be the radiation attenuation of the lung parenchyma and a bulla therein. Further, it is assumed that an object from the object class is shaped differently than an object not from the object class. More specifically, it is assumed that an object from the object class has, at least in part, a rather smooth contour.

The present invention first identifies candidate objects in the image data which may or may not be from the object class. To be able to decide whether it is likely that the candidate object is from the object class, the shape of the candidate object is determined by finding contour points which lie on (or at least in the vicinity of) the contour of the candidate object. Then, the present invention tests whether the contour points of the candidate object may be described by arc segments. If it is possible to describe the contour points of the candidate object by arc segments, it is likely that the candidate object is from the object class. If, however, it is not possible to describe the contour points of the candidate object by arc segments, it is unlikely that the candidate object is from the object class. Thus, even though the candidate object may, for example, be an area of low radiation attenuation, its contour lacks the smoothness normally observed for objects from the object class. In this case, the candidate object is more likely to be an artifact. The likelihood of the candidate object being from the object class is expressed by a score. Therefore, the present invention allows differentiation between an object of an object class of interest and artifacts.

Preferably, the image data originate from CT scanning. The image data may correspond to typical CT volumes and slices thereof. The image data may originate from low dose CT screening applications. The image data may also originate from a magnetic resonance imaging system, a nuclear imaging system, such as a single photon emission computed tomography imaging system or a positron emission computed tomography imaging system, or an ultrasound imaging system. However, the image data may also be an image data of another imaging modality. Preferably, the image data are medical image data. In particular, the image data may show a part of a person or an animal. For example, the image data may show the lung of a person. The image data may be digital image data. The image elements of the image data may be pixels or voxels, depending on whether the image data are evaluated two- or three-dimensionally, respectively.

The image data receiving unit may be a storing unit in which the image data are stored and from which the image data may be retrieved so as to provide the image data. The image data receiving unit can also be an imaging system which generates the image data. For instance, as noted above, the image data may be generated by CT scanning. The image data receiving unit may also be a transfer unit which allows transferring the image data to the seed element selecting unit directly or via another unit for providing the image data. For example, the image data receiving unit may be a wired or wireless data transmission unit or an optical data transmission unit. The image receiving unit also receives image data of the candidate object.

Preferably the seed element selection unit selects the seed elements based on the physical property values of the image elements, wherein the seed elements are indicative for a candidate object.

The contour points of a candidate object need not circumscribe the candidate object entirely, but may also circumscribe only a part of the candidate object.

The arc segments which are fitted to the contour points of the candidate object are not of a wavy shape but arc-shaped. The arc segments are not necessarily circular arc segments.

Preferably, contour point subsets are composed of contour points which are connected to each other. This means that when a certain contour point is comprised in a contour point subset, the two contour points which are directly adjacent that certain contour point are also comprised in the contour point subset, unless that certain contour point forms a starting or end point of the contour point subset, in which case that certain contour point has only one directly adjacent contour point which is comprised in the contour point subset. Preferably, the apparatus further comprises a limit value setting unit for setting at least one predetermined physical property limit value, the contour point identifying unit being further configured to sample the image data by casting a predetermined number of search rays, emanating from each seed element, into the image data, wherein each search ray terminates at a termination point when a physical property value of an image element sampled by the search ray becomes larger than the physical property limit value, wherein the termination point of the search ray defines a contour point. Therefore, the number of contour points for each candidate object is constant. In this way, the computational cost associated with larger candidate objects (which comprise more image elements) is similar to the computational cost associated with smaller candidate objects (which comprise less image elements), even though the contour or circumference of larger candidate objects is larger than for smaller candidate objects. The faster the apparatus processes the image data, the better a user may interact with the apparatus in an interactive manner.

Preferably, the seed score assigning unit is further configured to weight each seed score assigned to a seed element based on an average physical property value of the image elements sampled by the search rays emanating from the seed element. When the image data are medical image data of bullous emphysema, the seed score assigning unit may give more weight to candidate objects which relate to areas of lower radiation attenuation than to candidate objects which relate to areas of higher radiation attenuation. Thus, when the object class is that of bullae in lung parenchyma, areas of lower radiation attenuation are more likely to be bullae and may therefore be given more weight.

Preferably, the arc segment generating unit is configured to fit, for each seed element, the arc segments to the distance from each contour point of a contour point subset generated for the seed element to the seed element. The distance from a contour point to its respective seed element may be given by the length of the search ray connecting the seed element with the contour point. When the candidate object is viewed from in a polar coordinate system, where the seed element is at the pole of the polar coordinate system, then the distance from a contour point to the associated seed element is the radius of the contour point. The polar coordinates of the contour points may be transformed into a Cartesian coordinate system and a line fit may be performed on the contour points in the Cartesian coordinate system. For example, the radii of the contour points may be taken as a function of their polar angles. Then, a straight line may be fitted to this function. Transforming back the fitted line into the polar coordinate system may yield an arc segment.

Preferably, the predetermined selection criterion defines that a selected arc segment deviate less than a predetermined distance from each contour point that is approximated by the arc segment. This predetermined selection criterion thus defines a goodness of fit criterion between a contour point subset and an arc segment fitted thereto. This predetermined selection criterion may be implemented in an efficient way in terms of its computational cost.

The predetermined selection criterion may further define that an arc segment is selected when the number of contour points that are approximated by the arc segment is maximized. In other words, when applying this predetermined selection criterion, the apparatus may approximate the contour points of a seed element (and of a respective candidate object) by the largest arc segments possible. It is preferred that these largest arc segments do not overlap. This means that the contour points which are described by one largest arc segment have no contour points in common with the contour points which are described by another largest arc segment.

Alternatively, the contour point subset generating unit is configured to generate, for each seed element, contour point subsets with a predetermined number of contour points. In this case, the operation of the apparatus is generally more cost efficient in terms of computational cost than maximizing the number of contour points that may be approximated by an arc segment. Additionally, the results could be shown to also be robust and reliable.

Preferably, the seed score assigning unit is configured to determine each seed score assigned to a seed element as a function of the number of contour points associated with the seed element that are approximated by a selected arc segment and the total number of contour points associated with the seed element. Put another way, when a seed element has a certain total number of contour points, then the likelihood that the candidate object circumscribed by the contour points is from the object class is higher the more contour points may be approximated by an arc segment. This is due to the assumption that the contour of the candidate object is smoother the more contour points can be approximated by arc segments. In this way, the apparatus may also identify bullae with contours that are not closed and/or far from spherical. For instance, the bullae may be spiculated or interrupted due to anatomical clutter.

Preferably, the apparatus further comprises an object class score assigning unit for assigning an object class score to the image data, wherein the object class score assigning unit is configured to select those seed elements for which the number of contour points associated with the seed element that are approximated by a selected arc segment to the total number of contour points associated with the seed element is greater than a predetermined threshold value and to assign an object class score to the image data, the object class score being a function of at least one of the following parameters:

the seed scores assigned to the seed elements, an average object radius that, for each selected seed element, is calculated from the distances of the contour points associated with the seed element that are approximated by a selected arc segment, and a relative location of each selected seed element in the image data.

These parameters may be combined into a classifier function. In case of image data of bullous emphysema, the classifier function may give more weight to bullae in the upper lung lobes because such bullae are statistically more dangerous than bullae in the lower lung lobes. Also, more weight may be given to bullae of larger size because the severity of bullous emphysema is higher for larger the bullae than for smaller bullae.

It is also preferred that the apparatus further comprises an output unit for outputting the object class score assigned to the image data. Using the object class score, the apparatus may be configured to set a viewport of the image data on the output unit to an image slice which exhibits the highest slice-wise object class score. The object class score may be an emphysema score indicative of the severity of bullous emphysema.

Additionally, the apparatus may further comprise an arc segment highlighting unit for highlighting the selected arc segments in an overlay image and combining the overlay image with the image data. A user may then compare the outputted object class score with the highlighted arc segments overlaid with the image data. The user may then decide whether the apparatus has identified all objects from the object class of interest. The user may also decide whether the apparatus has identified correctly only objects from the object class of interest. This allows a user to adjust his/her confidence in the outputted object class score.

According to a second aspect of the present invention, a medical imaging system is presented which comprises:

a medical image data generating unit for generating medical image data of an object of an object class, and the above described apparatus for identifying a candidate object in the medical image data generated by the medical image data generating unit and determining a likelihood that the candidate object is an object from the object class.

The medical image data generating unit may be a CT scanner. Alternatively, the medical image data generating unit may be one of the other imaging modalities described above.

According to a third aspect of the present invention, a method for identifying a candidate object in image data and determining a likelihood that the candidate object is an object from an object class is presented, the method comprising the steps of:

receiving image data of an object of the object class, wherein the image data comprise image elements representing a physical property value of the image data, selecting a portion of the image elements as seed elements, identifying, for each seed element, contour points, the contour points of a seed element circumscribing a candidate object which comprises the seed element, and determining, for each seed element, a seed score indicative of a likelihood that the candidate object is an object from the object class by:

generating, for each seed element, a plurality of contour point subsets of the contour points of the seed element, generating, for each seed element, a fitted arc segment for each of the contour point subsets of the seed element by fitting an arc segment to each of the contour point subsets of the seed element, selecting those fitted arc segments that fulfill a predetermined selection criterion, and assigning, to each seed element, a seed score based on the selected arc segments.

According to a fourth aspect of the present invention, a computer program for identifying a candidate object in image data and determining a likelihood that the candidate object is an object from an object class is provided, the computer program comprising program code means for causing an apparatus as defined in claim 1 to carry out the steps of the method as defined in claim 14, when the computer program is run on a computer controlling the apparatus.

It shall be understood that the apparatus of claim 1, the medical imaging system of claim 13, the method of claim 14, and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
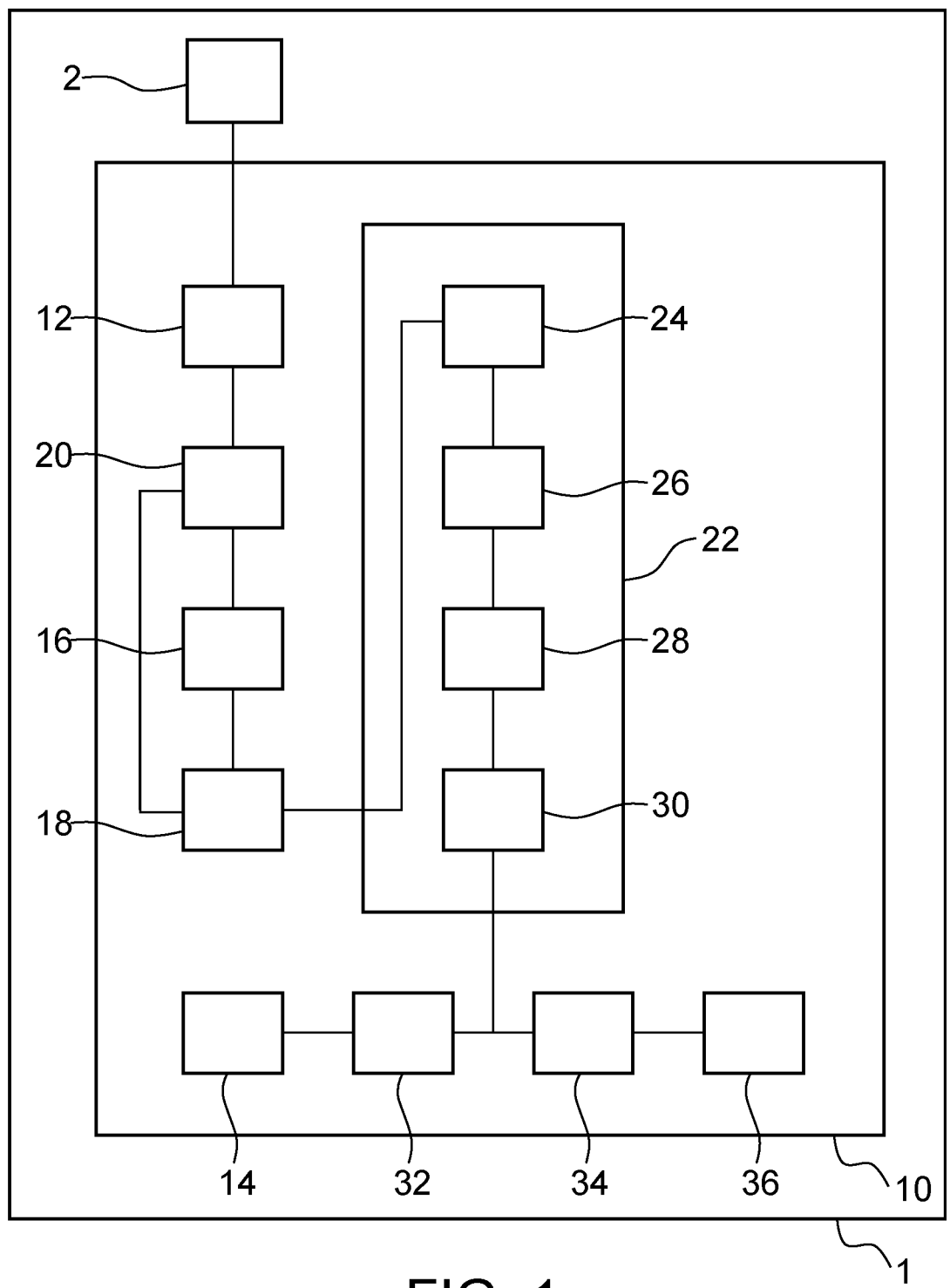
FIG. 1 shows schematically and exemplarily a medical imaging system according to the present invention.

FIG. 1 shows schematically and exemplarily a medical imaging system 1 comprising a medical image data generating unit 2 and an apparatus 10 for identifying a candidate object in image data and determining a likelihood that the candidate object is an object from an object class. The present invention will be described in relation to the detection, quantification and visualization of bullous emphysema in lung parenchyma. Bullous emphysema is characterized by damaged alveoli that distend to form exceptionally large air spaces (bullae), especially within the uppermost portions of the lungs. Emphysema is a manifestation of chronic obstructive pulmonary disease (COPD), but also the most significant risk indicator for suspecting lung cancer.

In the present embodiment, the object class is that of bullae. An object is from the object class "bullae" when the object is an enlarged air space in the lung parenchyma (bulla). It will be understood that the following description may also be applied to the identification of an object from another object class.

The apparatus 10 comprises an image data receiving unit 12. The image data receiving unit 12 is configured to receive the medical image data of an object of the object class generated by the medical image data generating unit 2.

The image data comprise image elements and each image element represents a physical property value of the image data. Preferably, the medical image data generating unit 2 is a CT scanner and the image data are medical CT image data originating from the medical image data generating unit 2. For example, the image data may be a reconstruction matrix originating from CT scanning and the physical property is the radiation attenuation. The reconstruction matrix may comprise a plurality of voxels. Each voxel represents how much attenuation of x-ray radiation occurs in each voxel of the reconstruction matrix. Conventionally, the radiation attenuation value of each voxel of the reconstruction matrix is expressed by a so-called CT number given in Hounsfield units (HU). As per definition, distilled water (at standard pressure and temperature (SPT)) has a CT number of 0 HU and air (at SPT) has a CT number of −1000 HU.

The image data may also be an image matrix which may comprise a plurality of pixels. The image matrix may be derived from the reconstruction matrix. The image matrix may be used to compose an image on a display device 14. Generally, the CT numbers of the voxels correlate to gray levels in the displayed image. On a conventional computer monitor, a maximum of 256 gray levels can be displayed simultaneously. The size of the pixels of the image matrix may be interpolated from the reconstruction matrix to meet the requirements of the display device 14 or to graphically enlarge (zoom) the displayed image.

In the following, it is assumed that the image data represent a plurality of slices of a scanned CT volume, in particular medical image data of the lung of a person, and that the image elements are pixels. The image data of the lung may be segmented out of the medical image data. Further, the image data of the principal airways may be segmented and excluded from the image data of the lung. Additionally, a spatial smoothing may be applied to the image data to reduce image noise.

The apparatus 10 further comprises a seed element selecting unit 16. The seed element selecting unit 16 is configured to select a portion of the image elements as seed elements. The apparatus 10 may further comprise a limit value setting unit 20. The limit value setting unit 20 may be configured to set a first predetermined radiation attenuation limit value P1. The first predetermined radiation attenuation limit value P1 may be close to and slightly larger than the radiation attenuation value of air. In one embodiment, the limit value setting unit 20 may be configured to determine a global histogram based on the radiation attenuation values of all image elements of the image data. The global histogram may represent the distribution of the radiation attenuation values of all image elements of the image data. The limit value setting unit 20 may be configured to set the peak of the global histogram or the global histogram distribution as the first predetermined radiation attenuation limit value P1. It will be appreciated that the global histogram may be replaced by a histogram of a local neighborhood of the image data. In this way, systematic shifts in the radiation attenuation values of the image elements may be accounted for. Systematic shifts in the radiation attenuation values of the image elements may be caused by the radiation being directed, for example, in the craniocaudal or ventrodorsal direction during the acquisition of the image data.

The seed element selecting unit 16 may be configured to select every other image element as a seed element. However, it will be appreciated that the seed element selecting unit 16 may be configured to select every one in three, four, etc. image elements of the image data. Additionally or alternatively, the portion of the image elements which are selected by the seed element selecting unit 16 as seed elements may be those image elements in the image data that have a radiation attenuation value that is smaller than the first predetermined radiation attenuation limit value P1.

Figure 2:
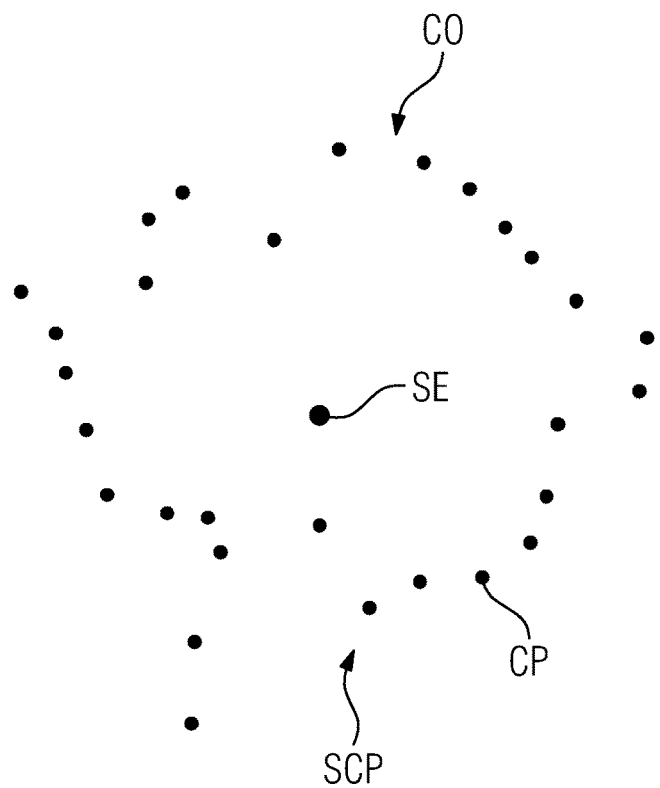
FIG. 2 shows schematically and exemplarily a candidate object identified using an apparatus according to the present invention.

The apparatus 10 further comprises a contour point identifying unit 18. The contour point identifying unit 18 is configured to identify contour points CP for each seed element SE. This is illustrated in FIG. 2. The contour points CP of a seed element SE circumscribe a candidate object CO. The candidate object CO comprises the seed element SE. The contour points CP of a seed element SE form a set of contour points SCP. Thus, the seed element selecting unit 16 and the contour point identifying unit 18 are configured to identify a candidate object CO. A seed score determining unit 22 is configured to determine a likelihood that the candidate object CO is from the object class of interest. The seed score determining unit 22 is described in detail below.

Figure 3:
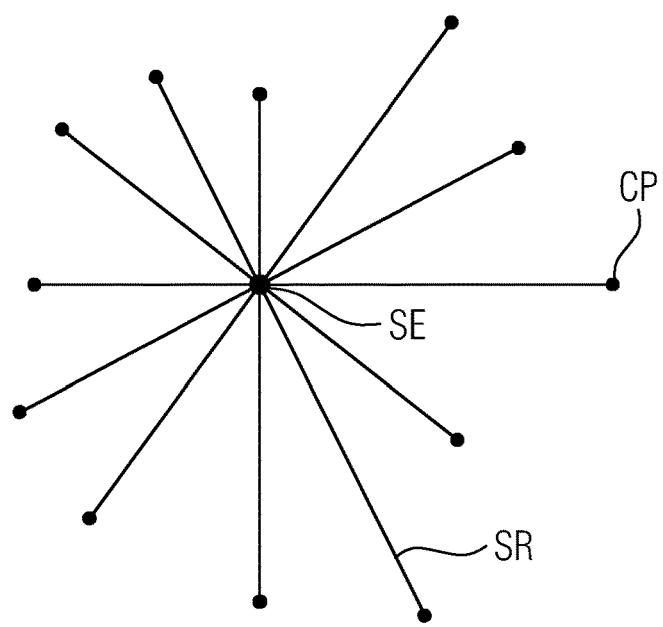
FIG. 3 shows schematically and exemplarily search rays emanating from a seed element and cast into the image data.

The contour point identifying unit 18 may be configured to sample the image data by casting search rays SR, emanating from a seed element SE, into the image data. This is illustrated in FIG. 3. Preferably, the search rays SR are cast isotropically into the image data in all directions. In other words, it is preferred that any two directly adjacent search rays SR define the same angle between each other. Preferably, the number of search rays that emanate from a seed element SE is between 100 and 200. However, to reduce computational cost, the number of search rays may be between 30 and 70. Robust results have been achieved with 48 search rays.

Each search ray SR terminates at a termination point when a radiation attenuation value of an image element sampled by the search ray SR becomes larger than a second radiation attenuation limit value P2 set by the limit value setting unit 20. The termination point of each search ray SR defines a contour point CP. A search ray SR may or may not terminate at an image element. The second radiation attenuation limit value P2 may be equal to the first radiation attenuation limit value P1. Alternatively, the second radiation attenuation limit value P2 may differ from the first predetermined radiation attenuation limit value P1. For example, the second radiation attenuation limit value P2 may be slightly larger than the first predetermined radiation attenuation limit value P1.

The apparatus 10 further comprises a seed score determining unit 22 for determining, for each seed element SE, a seed score S indicative of a likelihood that the candidate object is an object from the object class. In other words, the seed score may be indicative of a likelihood that the candidate object is a bulla.

The seed score determining unit 22 comprises a contour point subset generating unit 24, an arc segment generating unit 26, a fitted arc segment selecting unit 28 and a seed score assigning unit 30. The contour point subset generating unit 24 is configured to generate, for a seed element SE, a plurality of contour point subsets CPS of the contour points CP of the seed element SE. The arc segment generating unit 26 is configured to generate, for the seed element, a fitted arc segment for each of the contour point subsets of the seed element. The arc segment generating unit 26 is configured to generate a fitted arc segment by fitting an arc segment to each of the contour point subsets of the seed element. The fitted arc segment selecting unit 28 is configured to select, for the seed element, those fitted arc segments that fulfill a predetermined selection criterion. The fitted arc segment selecting unit 28 may also be configured to store fitted arc segments. The seed score assigning unit 30 is configured to assign, to the seed element, a seed score based on the selected arc segments. However, the seed score determining unit 22 is configured to determine a seed score not only for a single seed element, but for each seed element.

Figure 4:
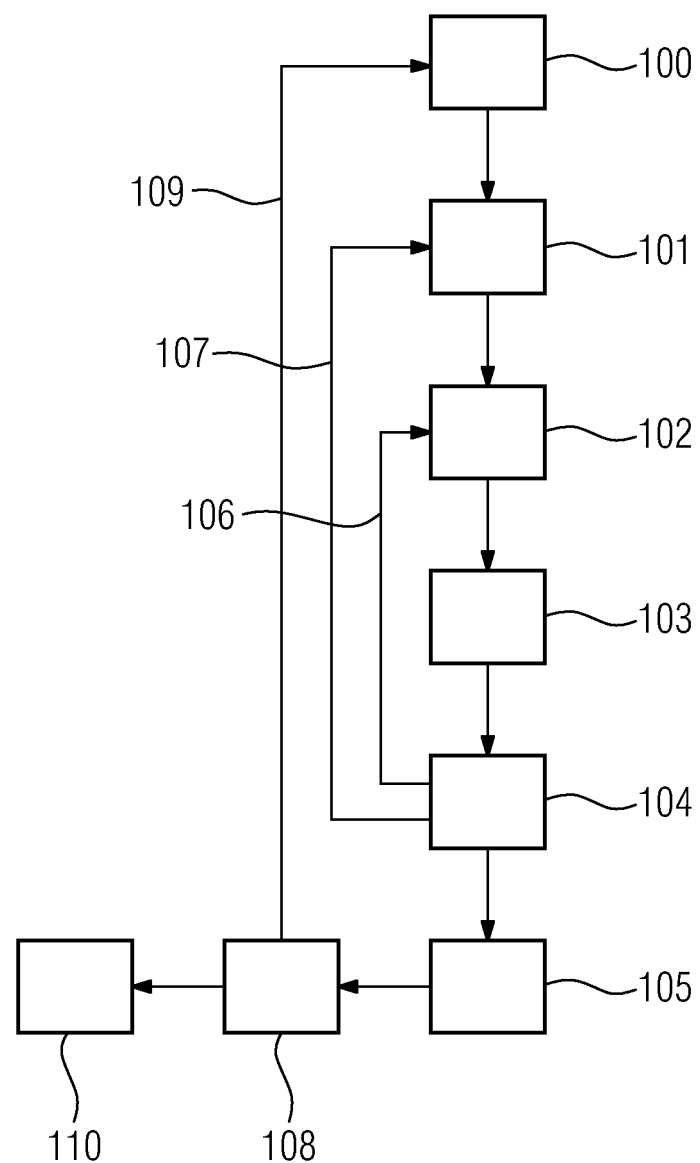
FIG. 4 shows schematically and exemplarily a flowchart of the operation of a seed score determining unit according to a first embodiment of an apparatus of the present invention.
Figure 5:
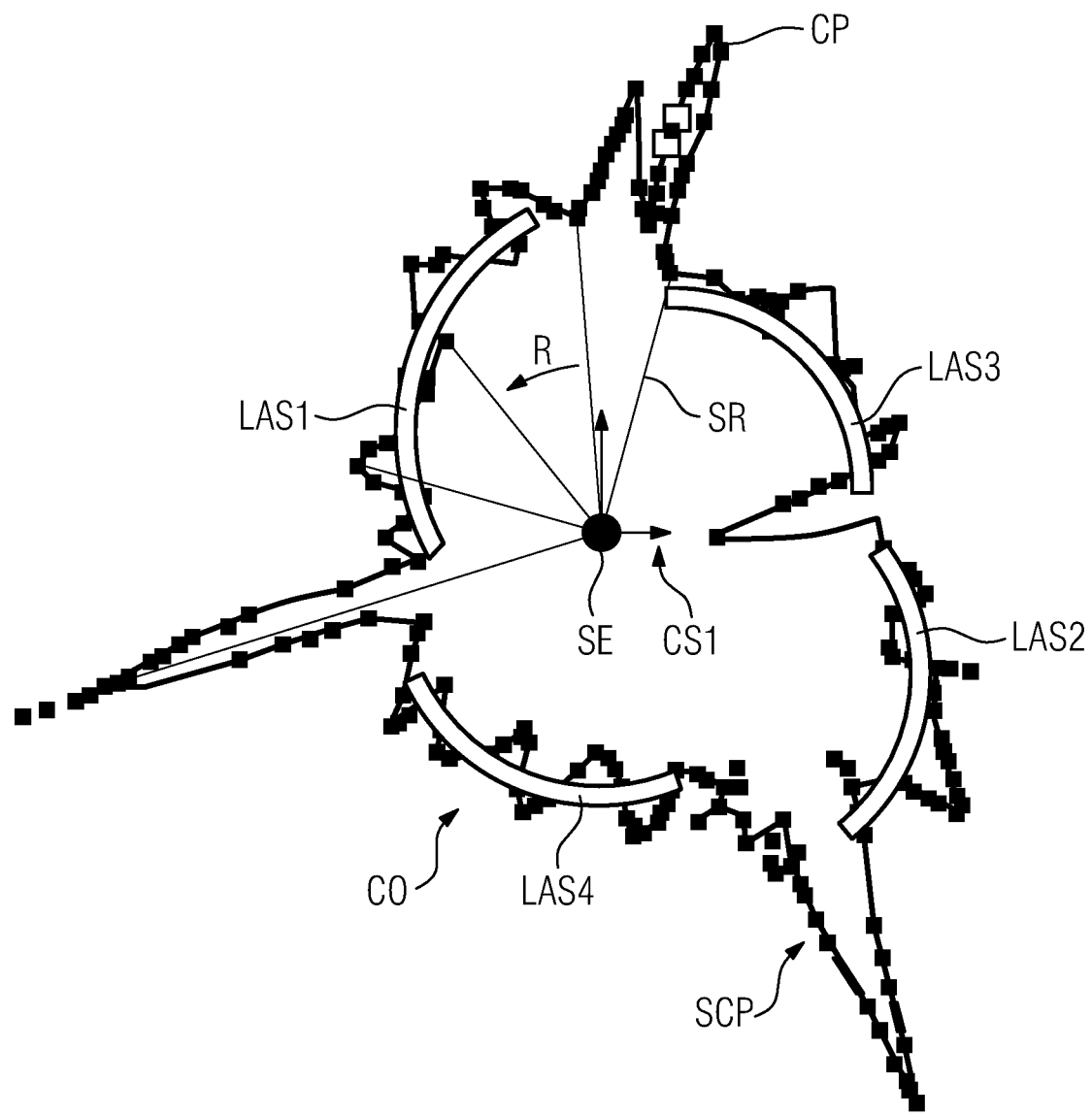
FIG. 5 shows schematically and exemplarily arc segments fitted to a candidate object using an apparatus according to the first embodiment.

FIGS. 4 and 5 illustrate the operation of the seed score determining unit 22 according to a first embodiment of the apparatus 10.

FIG. 4 illustrates a flowchart of the operation of the seed score determining unit 22 according to the first embodiment of the apparatus 10 with steps 100 to 110. In step 100, a seed element SE is selected by the seed element selection unit 16 and the respective set of contour points SCP of the seed element SE is identified by the contour point identifying unit 18. For the seed element SE, a first coordinate system CS1 and a second coordinate system CS2 is chosen. The first coordinate system is a polar coordinate system CS1 where the seed element SE is the pole. In the polar coordinate system CS1 of the seed element SE, the contour points CP of the set of contour points SCP of the seed element SE have radii r(CP) and polar angles α(CP). The radius r(CP) of a contour point CP may be given by the length of a search ray terminating at the contour point CP. The second coordinate system is a Cartesian coordinate system CS2, where the x-axis is given by the polar angles α(CP) of the contour points CP of the set of contour points SCP and the y-axis is given by radii r(CP) of the contour points CP of the set of contour points SCP.

Since the operation of the seed score determining unit 22 is the same for all seed elements (and all slices), it is demonstrated for one seed element SE (and for one slice) only.

In step 101, the contour point subset generating unit 24 selects a first contour point CP1 as a starting point.

In step 102, the contour point subset generating unit 24 generates a first contour point subset CPS1. Starting from the starting point CP1, the contour points CP are sampled in a predetermined sampling direction R. The predetermined sampling direction R may be a counterclockwise direction. A first contour point subset CPS1 may comprise the starting point CP1 and the two contour points CP2, CP3 which are directly adjacent the starting point CP1 in the predetermined sampling direction R. The contour point CP3 forms the end point of the first contour point subset CPS1.

In step 103, the arc segment generating unit 22 generates a fitted arc segment AS1 for the first contour point subset CPS1. To this end, the arc segment generating unit 22 is configured to form a function with the radius r(CP) of each contour point CP of the contour point subset CPS1 being dependent on the polar angle α(CP) of each contour point CP of the contour point subset CPS1. In other words, the contour points CP are transformed from the polar coordinate system CS1 to the Cartesian coordinate system CS2. A straight line SL1 is fitted to the contour points CP of the first contour point subset CPS1 in the Cartesian coordinate system. In the polar coordinate system CS1 of the seed element SE, the straight line SL1 forms a fitted arc segment AS1. Worded differently, the fitted arc segment AS1 approximates the radius r(CP) as a function of the polar angle α(CP) of each contour point CP of the first contour point subset CPS1.

In step 104, the fitted arc segment selecting unit 28 is configured to determine whether the fitted arc segment AS of the first contour point subset CPS1 satisfies a first predetermined selection criterion. Preferably, the first predetermined selection criterion generally defines that each contour point of a contour point subset may not deviate from the fitted arc segment of the contour point subset by more than a predetermined distance D. The predetermined distance D may range between 0.1 mm and 2.0 mm. Preferably, the predetermined distance D is 1.0 mm. The predetermined distance D refers to a distance in the first or second coordinate system CS1, CS2.

If the fitted arc segment AS1 of the first contour point subset CPS1 satisfies the first predetermined selection criterion, the fitted arc segment AS1 may be selected and stored by the fitted arc segment selecting unit 28 in step 105. If the fitted arc segment AS1 of the first contour point subset CPS1 does not satisfy the first predetermined selection criterion, the fitted arc segment AS1 may be discarded.

Then, steps 102 to 104 are repeated for a second contour point subset CPS2. This is indicated in step 106. In step 102, the contour point subset generating unit 24 generates the second contour point subset CPS2. The second contour point CPS2 may comprise the first contour point subset CPS1 and the two contour points CP4, CP5 which are directly adjacent the endpoint CP3 of the first contour point subset CPS1 in the predetermined sampling direction R. The contour point CP5 forms the endpoint of the second contour point subset CPS2. The second contour point subset CPS2 is thus larger than the first contour point subset CPS1. This means that the second contour point subset CPS2 contains more contour points than the first contour point subset CPS1. In this way, for a given contour point as the starting point, such as contour point CP1, subsequently generated contour point subsets become progressively larger than the first contour point subset. It will be understood that the choice of contour point subsets may deviate from the discussed example which only illustrates one possible way of the implementation of the seed score determining unit 22.

Steps 103 and 104 for the second contour point subset CPS2 are similar to steps 103 to 104 for the first contour point subset CPS1 such that a detailed discussion is omitted here for reasons of brevity.

Once all contour point subsets for the contour point CP1 have undergone steps 102 to 106, the contour point subset generating unit 24 proceeds with step 101. This is indicated in step 107. In step 101, the contour point subset generating unit 24 selects as a new starting point the contour point CP2 which is directly adjacent former starting point CP1 in the predetermined sampling direction R. Steps 102 to 106 are repeated for the new starting point CP2. Steps 102 to 106 for the starting point CP2 are similar to steps 102 to 107 for the starting point CP1 such that a detailed discussion is omitted here for reasons of brevity.

Steps 101 to 107 are repeated until all contour points CP have served as a starting point and all fitted arc segments have been obtained.

In step 108, the fitted arc segment selecting unit 28 selects, from all fitted arc segments of all starting points, the largest of the fitted arc segment. When the search rays are cast isotropically in all directions into the image data, the largest fitted arc segment is the fitted arc segment that was fitted to the contour point subset with the biggest number of contour points. The largest fitted arc segment defines a first largest fitted arc segment LAS1.

Once the first largest fitted arc segment LAS1 has been determined, steps 101 to 108 repeated with an amended set of contour points. This is indicated in step 109. More specifically, from the set of contour points SCP, those contour points are deleted which are associated with the first largest fitted arc segment LAS1.

When steps 101 to 108 are repeated for the amended set of contour points, step 108 yields a second largest fitted arc segment LAS2. The second largest fitted arc segment LAS2 is smaller than the first largest fitted arc segment LAS1.

Alternatively, it may be possible, for contour point subsets that have previously undergone steps 101 to 107, to revert to their respective fitted arc segments that have been stored by the fitted arc segment selecting unit 28 in step 105. In this way, some of steps 101 to 107 may be omitted.

Thus, the fitted arc segment selecting unit 28 may be configured to select those fitted arc segments that fulfill a second predetermined selection criterion. The second predetermined selection criterion may define that an arc segment is selected when the number of contour points that are approximated by the arc segment is maximized. In FIG. 5, the four largest arc segments LAS1, LAS2, LAS3 and LAS4 are depicted.

The procedure may terminate when a predetermined number of largest arc segments has been identified. Alternatively, the procedure may terminate when no more fitted arc segments may be determined that fulfill the first and second predetermined selection criterions. Still alternatively, the procedure may terminate when a predetermined portion of the contour points of the original set of contour points CP is associated with the largest fitted arc segments.

In step 110, the seed score assigning unit 30 assigns a seed score S to the seed element SE based on the selected arc segments. The seed score assigning unit 30 determines the seed score S that is to be assigned to a seed element SE as a function of the number of contour points associated with the seed element SE that are approximated by a selected arc segment and the total number of contour points associated with the seed element SE. Preferably, the seed score S of the seed element SE is 1 when a predetermined portion of the contour points of the original set of contour points CP is associated with a predetermined maximum number of the largest fitted arc segments that were first determined. Otherwise, the seed score S of the seed element SE is 0. The seed score S of any seed element SE may thus be either 0 or 1 in the first embodiment.

For example, the predetermined portion of the contour points of the original set of contour points CP may be between 40% and 80%. The predetermined maximum number of the largest fitted arc segments may be between 3 and 7. In other words, 40% to 80% of the contour points CP of the original set of contour points SCP may be approximated by the 3 to 5 largest fitted arc segments that fulfill both the first and second predetermined selection criterion.

It will be understood that the contour point subset generating unit 24 may also be configured to select as a starting point every other contour point, or every one in three, four, etc. contour points. For example, if every other contour point were chosen as a starting point, CP3 rather than CP2 would be the second starting point. It will further be understood that a contour point subset may differ from the directly preceding contour point subset not by two directly adjacent contour points, but also by three, four or more contour points.

Figure 6:
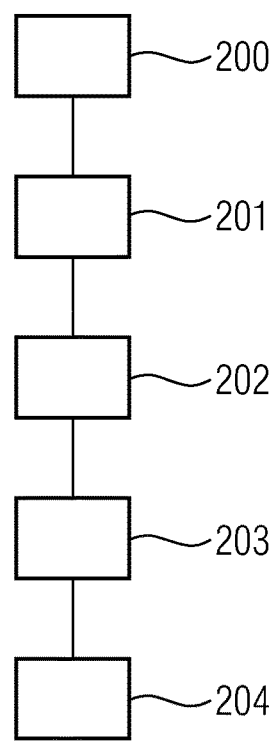
FIG. 6 shows schematically and exemplarily a flowchart of the operation of a seed score determining unit according to a second embodiment of an apparatus of the present invention.

FIG. 6 illustrates the operation of the seed score determining unit 22 according to a second embodiment of the apparatus 10. The operation of the seed score determining unit 22 according to the second embodiment is demonstrated for only one seed element SE (and only one slice).

FIG. 6 illustrates a flowchart of the operation of the seed score determining unit 22 according to the second embodiment of the apparatus 10 with steps 200 to 204. Regarding step 200, reference is made to the description of step 100 which is identical to step 200.

In step 201, the contour point subset generating unit 24 generates, for each contour point CP of the set of contour points SCP, a contour point subset CPS of a predetermined number of contour points. For example, for each contour point CP of the set of contour points SCP, the respective contour point subset CPS comprises the two contour points which are directly adjacent the contour point CP in a first sampling direction and the two contour points which are directly adjacent the contour point CP in a second sampling direction. The first and second sampling directions are opposite to each other. For instance, the first sampling direction may be a counterclockwise direction, while the second sampling direction may be a clockwise direction. It will be understood that instead of two directly adjacent contour points, three, four, etc. directly adjacent contour points may be used. Further, the number of contour points that are directly adjacent to the contour point in the first sampling direction may differ from the number of contour points that are directly adjacent to the contour point in the second sampling direction.

In step 202, the arc segment generating unit 26 generates a fitted arc segment for each of the contour point subsets of the seed element by fitting an arc segment to each of the contour point subsets CPS of the seed element SE. Assuming that a contour point CP* is assigned a contour point subset CPS, this may be done as follows. The arc segment generating unit 22 fits a straight line SL to a function in the second coordinate system CS2 where the independent variable is the polar angle α(CP) of each contour point CP of the contour point subset CPS but the contour point CP* and the dependent variable is the radius r(CP) of each contour point CP of the contour point subset CPS but the contour point CP*. Worded differently, the straight line SL is fitted to the two directly adjacent contour points of the contour point CP* in the first and second sampling direction, leaving out the contour point CP*. This is in contrast to the first embodiment, where an arc segment is fitted to all the contour points CP of a contour point subset CPS.

In step 203, the fitted arc segment selecting unit 28 determines whether the fitted arc segment of each contour point subset CPS, in particular the contour point CP*, satisfies a predetermined selection criterion. Similar to the first embodiment, the predetermined selection criterion may define that each contour point CP of a contour point subset CPS may not deviate from the fitted arc segment of the contour point subset CPS by more than a predetermined distance D. The predetermined distance D may range between 0.1 mm and 2.0 mm. Preferably, the predetermined distance D is 1.0 mm. If the selection criterion is fulfilled, the straight line SL in the second coordinate system CS2 forms the fitted arc segment AS in the polar coordinate system CS1. Furthermore, the fitted arc segment AS approximates the radii r(CP) of the contour points CP of the contour point subset CPS as a function of the polar angle $\alpha$(CP) of the contour points CP of the contour point subset CPS.

If a fitted arc segment AS of a contour point subset CPS satisfies the predetermined selection criterion, the fitted arc segment AS may be selected and stored by the fitted arc segment selecting unit 28. If a fitted arc segment AS of a contour point subset CPS does not satisfy the first predetermined selection criterion, the fitted arc segment AS may be discarded.

In step 204, the seed score assigning unit 30 assigns a seed score S to the seed element SE based on the selected arc segments once all the fitted arc segments that fulfill the predetermined selection criterion have been selected by the fitted arc segment selecting unit 28. Preferably, the portion of contour points CP that gave rise to a contour point subset CPS to which a selected arc segment exists is assigned as the seed score S to the seed element SE. The seed score S may thus range between 0% and 100%. It will be understood, however, that the seed score S may be expressed in any other suitable way.

Independent of the operation of the seed score determining unit 22, it is preferable that the seed score assigning unit 30 is further configured to weight the seed score S assigned to a seed element SE based on an average radiation attenuation value of the image elements sampled by the search rays emanating from the seed element SE. According to one embodiment, each seed score S is enhanced by weighting the seed score S with a density term between 0 and 1. The density term may indicate the relative position of the average radiation attenuation value with respect to a first predetermined reference value and a second predetermined reference value. The first predetermined reference value may be −1000 HU, the CT number of air, and the second predetermined reference value may be the first predetermined radiation attenuation limit value P1. In this way, candidate objects with a lower average radiation attenuation value may be given more weight than candidate objects with a higher average radiation attenuation value. The reason is that candidate objects with a lower average radiation attenuation value are more likely than candidate objects with a higher average radiation attenuation value to represent air filled spaces, i.e. bullae.

The apparatus 10 further comprises an arc segment highlighting unit 32. The arc segment highlighting unit 32 is configured to highlight the selected arc segments in an overlay image and to combine the overlay image with the image data. As shown in FIG. 1, the arc segment highlighting unit 32 may be connected to the display device 14 so as to display the selected arc segments visually highlighted on the overlay image using a color. The opacity of a highlighted selected arc segments may depend on the magnitude of the seed score S of the seed element SE with which the highlighted selected arc segment is associated.

Figure 7:
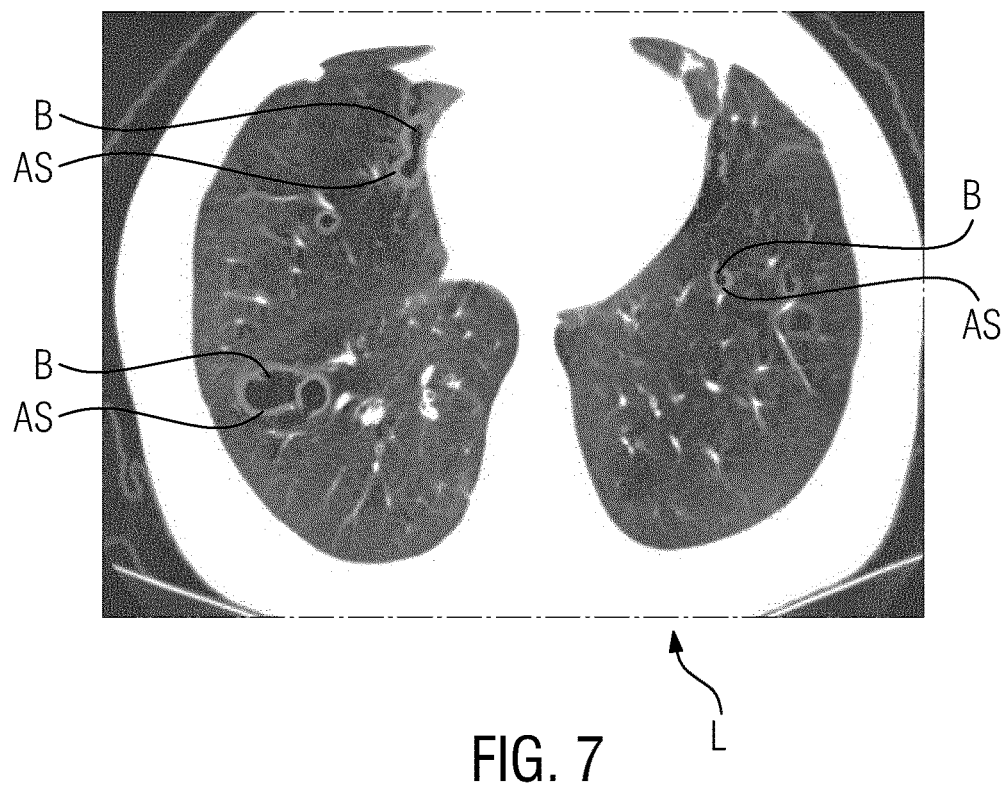
FIG. 7 shows schematically and exemplarily a display of an apparatus according to the first embodiment.

FIG. 7 shows an example of a display of the display device 14 of an apparatus according to the first embodiment. In FIG. 7, image data of the lung L of a person are shown. The lung L of the person is affected with bullous emphysema, wherein the bullae are denoted by reference sign B. The contour of each bullae B is highlighted with arc segments AS.

The apparatus 10 may further comprise an object class score assigning unit 34. The object class score assigning unit 34 may be configured to select those seed elements SE for which the number of contour points CP associated with the seed element SE that are approximated by a selected arc segment to the total number of contour points associated with the seed element SE is greater than a predetermined threshold value. In the first embodiment of apparatus 10, those seed element SE may be selected which have a seed score S of 1. In the second embodiment of apparatus 10, those seed elements SE may be selected which have a seed score S that is greater than a predetermined threshold. The predetermined threshold may be a value between 50% and 70%.

The object class score assigning unit 34 may be further configured to assign an object class score to the image data. The object class score may be a function of at least one of the following parameters:
the seed scores assigned to the seed elements,
an average object radius that, for each selected seed element, is calculated from the distances of the contour points associated with the seed element that are approximated by a selected arc segment, and
a relative location of each selected seed element in the image data.

Preferably, the object class score is computed by the object class score assigning unit 34 using a classifier which combines the above parameters.

Additionally, the apparatus 10 may comprise an output unit 36 for outputting the object class score assigned to the image data. Furthermore, by highlighting the selected arc segments on the image data on the display device 14, the user may be able to comprehend the magnitude of an outputted object class score assigned to the image data. Further, it may become apparent to the user that the object class score assigned to the image data was based on arc segments which, for example, do in fact not belong solely to objects from the object class. It may also be possible that not all objects of the object class have been identified by the apparatus. In these cases, the user may correspondingly change his/her confidence in the object class score assigned to the image data.

Even though the embodiments have been described for pixels as image elements, it will be understood by those of skill in the art that the procedure is applicable also to voxels. Thus, the present invention may also be applied to three-dimensional image data for which spherical surface segments are identified rather than arc segments. Further, the present invention is not limited to the physical property of an image element being the radiation attenuation of the image element.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored or distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

The invention relates to an apparatus for identifying a candidate object in image data and determining a likelihood that the candidate object is an object from an object class. The apparatus comprises an image data receiving unit for receiving image data of an object of the object class, a seed element selecting unit for selecting a portion of the image elements as seed elements, a contour point identifying unit for identifying, for each seed element, contour points, the contour points of a seed element circumscribing a candidate object which comprises the seed element, and a seed score determining unit for determining, for each seed element, a seed score indicative of a likelihood that the candidate object is an object from the object class. The invention allows differentiation between an object of an object class of interest and artifacts.

The invention claimed is:

1. An apparatus for identifying a candidate object in image data and determining a likelihood that the candidate object is an object from an object class, the apparatus comprising:
 a memory that stores a plurality of instructions; and
 processor circuitry that couples to the memory and is configured to execute the instructions to:
  receive image data of the object of the object class, wherein the image data comprise image elements representing a physical property value of the image data;
  select a portion of the image elements as seed elements;
  identify, for each seed element, contour points of a seed element circumscribing a candidate object which comprises the seed element; and
  determine, for each seed element, a seed score indicative of a likelihood that the candidate object is an object from the object class, the determining of the seed score comprising:
   generating, for each seed element, a plurality of contour point subsets of the contour points of the seed element;
   generating, for each seed element, a fitted arc segment for each of the contour point subsets of the seed element by fitting an arc segment to each of the contour point subsets of the seed element;
   selecting, for each seed element, the fitted arc segments that fulfill a predetermined selection criterion; and
   based on the selected fitted arc segments, assigning to each seed element the seed score indicative of the likelihood that the candidate object is the object from the object class.

2. The apparatus of claim 1, wherein the processor circuitry is further configured to:
 set at least one predetermined physical property limit value,
 sample the image data by casting a predetermined number of search rays emanating from each seed element into the image data,
 wherein each search ray terminates at a termination point when a physical property value of an image element sampled by the search ray becomes larger than the physical property limit value, wherein the termination point of the search ray defines a contour point.

3. The apparatus of claim 2, wherein the processor circuitry is further configured to weight each seed score assigned to a seed element based on an average physical property value of the image elements sampled by the search rays emanating from the seed element.

4. The apparatus of claim 3, wherein the processor circuitry is further configured to assign an object class score to the image data, wherein the processor circuitry is further configured to select those seed elements for which the number of contour points associated with the seed element that are approximated by a selected arc segment to the total number of contour points associated with the seed element is greater than a predetermined threshold value and to assign an object class score to the image data, the object class score being a function of at least one of:
 the seed scores assigned to the seed elements,
 an average object radius that, for each selected seed element, is calculated from the distances of the contour points associated with the seed element that are approximated by a selected arc segment, and
 a relative location of each selected seed element in the image data.

5. The apparatus of claim 4, wherein the processor circuitry is further configured to output the object class score assigned to the image data.

6. The apparatus of claim 1, wherein the processor circuitry is further configured to fit, for each seed element, the arc segments to the distance from each contour point of a contour point subset generated for the seed element to the seed element.

7. The apparatus of claim 6, wherein the predetermined selection criterion defines that a selected arc segment deviate less than a predetermined distance from each contour point that is approximated by the arc segment.

8. The apparatus of claim 7, wherein the predetermined selection criterion further defines that an arc segment is selected when the number of contour points that are approximated by the arc segment is maximized.

9. The apparatus of claim 1, wherein the processor circuitry is further configured to generate, for each seed element, contour point subsets with a predetermined number of contour points.

10. The apparatus of claim 1, wherein the processor circuitry is further configured to determine each seed score assigned to a seed element as a function of the number of contour points associated with the seed element that are approximated by a selected arc segment and the total number of contour points associated with the seed element.

11. The apparatus of claim 1, wherein the processor circuitry is further configured to highlight the selected arc segments in an overlay image and combine the overlay image with the image data.

12. The apparatus of claim 1, wherein the image data represent a lung of a patient and the object class is that of bullae in the lung.

13. A medical imaging system, comprising:
 a medical image data generator configured to generate medical image data of an object of an object class; and
 the apparatus as defined in claim 1 for identifying a candidate object in the medical image data generated by the medical image data generator and determining a likelihood that the candidate object is an object from the object class.

14. A method for identifying a candidate object in image data and determining a likelihood that the candidate object is an object from an object class, the method comprising:

receiving image data of an object of the object class, wherein the image data comprise image elements representing a physical property value of the image data;

selecting a portion of the image elements as seed elements;

identifying, for each seed element, contour points of a seed element circumscribing a candidate object which comprises the seed element; and determining, for each seed element, a seed score indicative of a likelihood that the candidate object is an object from the object class by:

generating, for each seed element, a plurality of contour point subsets of the contour points of the seed element, generating, for each seed element, a fitted arc segment for each of the contour point subsets of the seed element by fitting an arc segment to each of the contour point subsets of the seed element, selecting the fitted arc segments that fulfill a predetermined selection criterion, and based on the selected fitted arc segments, assigning, to each seed element, the seed score indicative of the likelihood that the candidate object is the object from the object class.

15. A non-transitory computer-readable medium having one or more executable instructions stored thereon, which, when executed by a processor, cause the processor to perform a method for identifying a candidate object in image data and determining a likelihood that the candidate object is an object from an object class, the method comprising:

receiving image data of an object of the object class, wherein the image data comprise image elements representing a physical property value of the image data;

selecting a portion of the image elements as seed elements;

identifying, for each seed element, contour points of a seed element circumscribing a candidate object which comprises the seed element; and determining, for each seed element, a seed score indicative of a likelihood that the candidate object is an object from the object class by:

generating, for each seed element, a plurality of contour point subsets of the contour points of the seed element, generating, for each seed element, a fitted arc segment for each of the contour point subsets of the seed element by fitting an arc segment to each of the contour point subsets of the seed element, selecting the fitted arc segments that fulfill a predetermined selection criterion, and based on the selected fitted arc segments, assigning, to each seed element, the seed score indicative of the likelihood that the candidate object is the object from the object class.

\* \* \* \* \*